N. KOOPMAN.
BOB SLED.
APPLICATION FILED MAY 5, 1909.
937,943.
Patented Oct. 26, 1909.
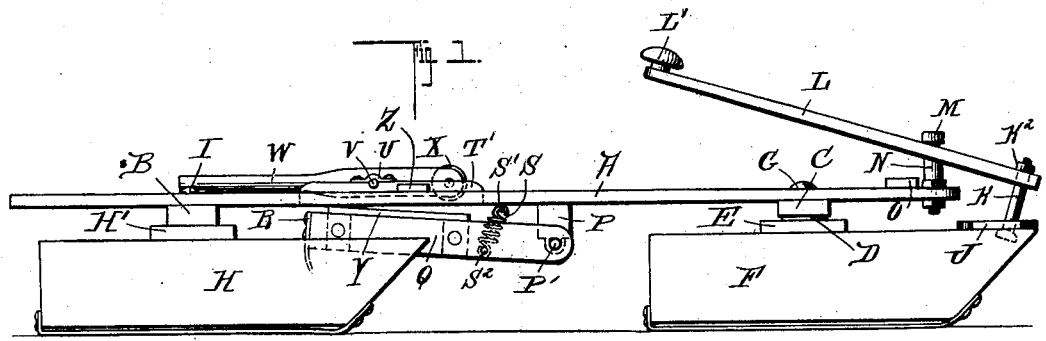
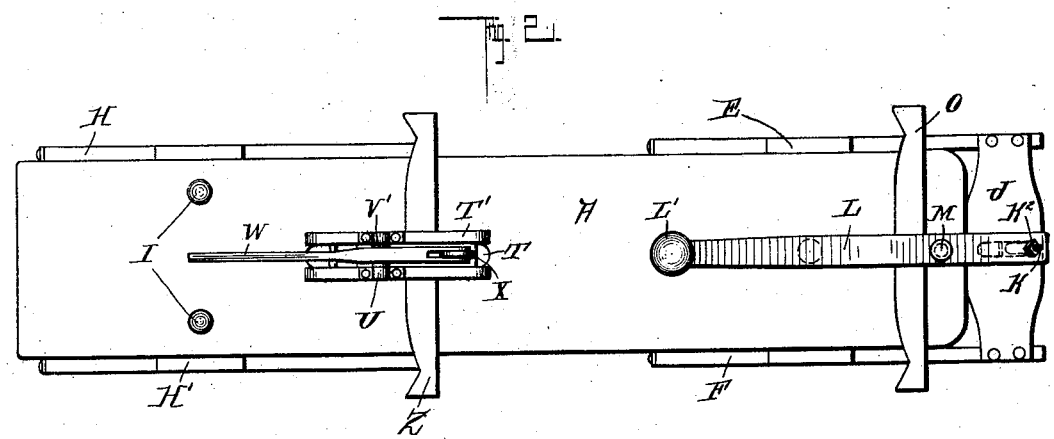
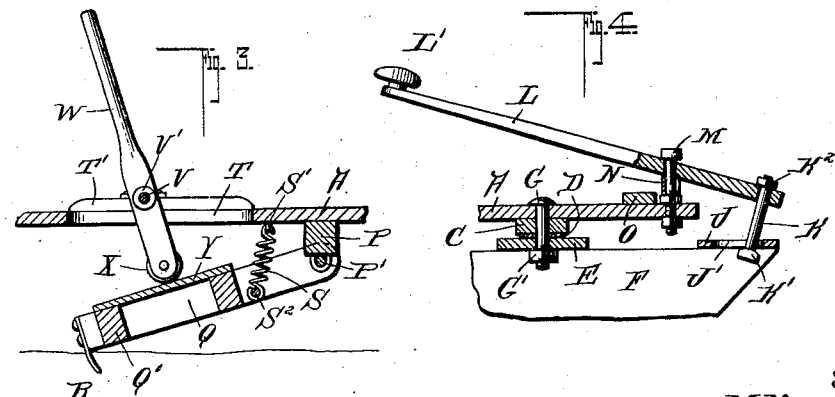
Witnesses
Philip H. Burch
Oliver W. Holmes
Inventor
N. Koopman,
By
Attorney

UNITED STATES PATENT OFFICE.

NICHOLAS KOOPMAN, OF CENTRAL LAKE, MICHIGAN.

BOB-SLED.

937,943.　　　　Specification of Letters Patent.　　Patented Oct. 26, 1909.

Application filed May 5, 1909. Serial No. 494,047.

*To all whom it may concern:*

Be it known that I, NICHOLAS KOOPMAN, a citizen of the United States, residing at Central Lake, in the county of Antrim and State of Michigan, have invented a new and useful Improvement in Bob-Sleds, of which the following is a specification.

This invention relates to bob-sleds, the object being to provide a bob-sled which is exceedingly cheap and simple in construction, and one which is composed of a very few parts which are so connected together that a very durable sled is obtained.

Another object of my invention is to provide very novel means for steering the sled, whereby the person can sit in an upright position and have perfect control over the sled.

A still further object of my invention is to provide the sled with a brake which is so constructed that when operated, the spurs will be thrown into engagement with the snow or ice in such a manner that they stop the momentum of the sled in a very short distance.

Another object of the invention is to provide a brake which is operated by a pivoted lever, so that great power can be applied to the same in order that the brake can be thrown into engagement with the snow or ice, and held in that position until the sled is stopped.

Another object of the invention is to provide a steering mechanism which comprises a pivoted steering lever mounted upon the board of the runner, and having a downwardly projecting pin at its forward end which works loosely in a slot formed in the cross bar of the front sled.

With these objects in view, my invention consists in the novel features of combination, arrangement and construction of parts, hereinafter fully described and pointed out in the claims.

In the drawing forming a part of this specification:—Figure 1 is a side elevation of my improved bob-sled. Fig. 2 is a top plan view of the same. Fig. 3 is a detail longitudinal section showing the brake in an operative position, and Fig. 4 is a detail longitudinal section through the forward portion of the sled, showing the steering mechanism.

In carrying out my improved invention, I employ a board A of any suitable length, having a bolster B secured to its under side at one end, and a bolster C secured to its under side adjacent its forward end, which is slightly rounded transversely, and is adapted to rest upon a washer D mounted upon the central cross bar E of the front sled F, over an opening formed therein. The board is securely fastened to the front sled F by a king-bolt G extending vertically through the board and bolster C, and the cross-bar E and is locked therein by a nut G' in such a manner that the front sled is allowed to turn freely upon the king-bolt in order that the sled can be steered. The rear bolster B is mounted upon a cross-bar H' of a rear-sled H, and is secured firmly thereon by bolts I extending vertically through the board, bolster and bar, so that the sled will be held firmly. The front sled F is provided with a cross bar J at its forward end having a slot J' formed therein, through which is adapted to extend a bolt K having a head K' at its lower end for holding the bolt therein, and provided with a nut $K^2$ at its upper end, for locking said bolt in an aperture formed in the forward end of a steering lever L, which is mounted on a vertical bolt M secured centrally in the board A at its forward end forming a stem upon which the lever works, said bolt being provided with a head at its upper end, and spaced nuts at its lower end for securing the same in position on the board. The bolt carries a sleeve N having a beveled upper end, upon which the lever L rests, said lever being provided with an opening of such a size that there will be considerable play for the lever, so that the same can extend rearwardly over the board at an angle as clearly shown, in order that the same may be in such a position that it can be readily operated by a person sitting on the board.

Secured transversely on the board, to the rear of the bolt M, is a foot-rest O for supporting the steerer's feet, in order that he may be in the proper position for steering the sled, and secured upon the rear end of the lever L is a knob L' which can be readily grasped by the person steering, in order that the lever can be readily operated.

Secured transversely to the underside of the board A between the sleds F and H is a bar P carrying a shaft P' on the ends of which are journaled the upper ends of the side-bars of a brake-frame Q, the lower end of the side bars carrying metal spurs R which are adapted to be forced into engagement with snow or ice, as will be hereinafter fully described. The frame is of such a width that it will fit between the runners of the rear sled H, and for normally holding the frame Q up against the underside of the board A, so that it will be out of an operative position, I employ a coil-spring S, one end of which is connected to an eye S' secured to the underside of the board, and the outer end is secured to a transverse-rod $S^2$ connecting the side bars of the brake-frame Q.

A slot T is formed longitudinally in the board A, over the frame Q having cleats T' secured along its edges upon the upper side of the board, provided with brackets U in which is mounted a shaft V on which is pivotally mounted a lever W which is held centrally between the cleats by washers V' and is provided with a bifurcated lower end, in which is pivotally mounted a roller X which is adapted to engage a track Y secured centrally on the top of the cross-bars Q' of the frame Q, so as to force the brake-frame downwardly and it will be seen by this construction the brake-frame can be forced into engagement with the snow or ice with such force that the sled will be stopped and after the lever is released the spring will return the frame to its normal position.

Extending outwardly from the board A, to each side of the cleats T, are foot-rests Z for supporting the person's feet in order that the brake may be operated readily.

Having thus fully described my invention, what I claim as new and desire to secure by Letters Patent is:—

1. A sled comprising a board having a fixed and a pivoted sled connected thereto, said board having a longitudinal slot formed therein, a spring actuated brake-frame pivotally mounted under said board, a track carried by said frame, a lever pivotally mounted in the slot of the board, and a roller carried by said lever adapted to engage said track.

2. A sled comprising a board having a pair of sleds connected thereto, a bar secured to the underside of said board between said sleds, a shaft carried by said bar, a brake-frame pivotally mounted on said shaft, spurs carried by said brake-frame, a spring connecting said frame to said board, a track carried by said frame, and a lever working through a slot in said board carrying a roller adapted to engage said track.

NICHOLAS KOOPMAN.

Witnesses:
HARRY OLMSTEAD,
THOS. D. MEGGISON.